Patented June 28, 1932

1,865,001

UNITED STATES PATENT OFFICE

RALPH T. GOODWIN, OF ELIZABETH, NEW JERSEY, ASSIGNOR TO STANDARD OIL DEVELOPMENT COMPANY, A CORPORATION OF DELAWARE

TREATMENT OF HYDROCARBON RESIDUES CONTAINING INORGANIC SUBSTANCES AND PRODUCT OBTAINED THEREBY

No Drawing. Application filed July 3, 1928. Serial No. 290,285.

This invention relates to improvements in removing sediment from cracked hydrocarbon residues by the processes described and claimed in United States Patents Nos. 1,660,294 and 1,660,295 granted to me on February 21, 1928. In these processes a small amount of a dilute acidic body is added to the cracked residue, primarily to substantially free it from carbonaceous sediment and sediment-forming bodies. In the present invention the method is extended to the treatment of cracked residues containing inorganic substances other than elemental carbon, especially suspended solids such as alkali metal or alkaline earth metal compounds (oxides, hydroxides, carbonates, etc.) which have been added to the oil to prevent or lessen corrosion of equipment during cracking, or for other purposes.

The present method will be fully understood from the following illustrative example, in which it is applied to the treatment of the tar residue from a cracking operation wherein the oil mixed with finely divided lime (calcium oxid or hydroxid) is cracked in a coil.

The cracked residue is agitated, preferably while still hot, with about 1% by volume of dilute sulfuric acid, approximately 30° Bé. The preferred temperature is about 200 to 275° F. A brief agitation, as by the use of a mixing column, will suffice to bring the oil and acid solution into intimate contact. The agitation should be continued for a short time to insure adequate reaction. The mixture is then allowed to settle. Inorganic and carbonaceous sediment precipitates rapidly.

The greater portion of the tar (approximately 90%) may be drawn off as a clean product. The remaining tar, which has a high solid content, may be substantially completely clarified by filtration, preferably through a rotary continuous vacuum filter. The tar is "stabilized" with respect to carbonaceous sediment, as described in my prior patents referred to. Moreover, it is substantially free from lime, which, if not removed, will give the tar an unduly high sediment content.

The results of treating are shown in the following table:

|  | Orig. oil | Treated oil |
|---|---|---|
| Gravity | 10.1° A. P. I. | 11.8° A.P.I. |
| Viscosity (Saybolt) | 24 at 122 | 19 at 122 |
| Sediment | 0.46 | 0.008 |
| B. S. | 1.7% | Trace |

The amount of acid will depend to a considerable extent on the quantity of lime or other added material to be removed. Ordinarily ½% to 1½% by volume of sulfuric acid of about 30 to 60° Bé. is sufficient. Larger proportions of acid may be used without disadvantage, but in all cases the amount will be less than that which would form substantial quantities of sludge by reaction with the oil. Sulfuric acid and especially spent acid from petroleum treating, is most economical but other acids having the property of precipitating the carbonaceous and inorganic sediment may be used, for example dilute hydrochloric acid, dilute acetic acid and dilute solutions of salts such as sodium acid sulphate or aluminum sulphate which hydrolyze to form acids. When the oil to be treated contains water, a more concentrated acid may be used so as to allow for dilution when added to the oil.

If the viscosity of the cracked residue is too high for efficient treating, a thinning or blending oil may be mixed with it. Similarly it is sometimes desirable to thin the residue after treatment with acid and before filtration. In general, the temperature of treating may be between atmospheric and about 800° F. From this it follows that the oil may be treated while it is at substantially the temperature of the cracking reaction. Pressure may be atmospheric or higher, for example that at which the cracking operation takes place.

The foregoing description is merely illustrative and various changes may be made within the scope of the appended claims, in which it is my intention to claim all novelty inherent in the invention as broadly as the prior art permits.

I claim:

1. Process of removing sediment-forming material from a cracked residue derived from cracking a hydrocarbon oil mixed with a solid alkaline substance, which comprises treating said residue with a dilute aqueous solution of sulfuric acid in non-sludge-forming concentration and removing material precipitated thereby.

2. Process of removing calcium oxide, calcium hydroxide, and other sediment-forming material from a cracked residue derived from cracking a hydrocarbon oil mixed with lime, which comprises treating said residue at elevated temperature with a dilute aqueous solution of sulfuric acid in non-sludge-forming concentration and removing material precipitated thereby.

3. A heavy hydrocabron oil prepared by treating with a small amount of acid in non-sludge-forming concentration, an alkali-containing tar derived by cracking oil in the presence of alkali, the treated oil being characterized by stability against the formation of organic and inorganic sediment.

4. A heavy hydrocarbon oil prepared by treating with a small amount of sulfuric acid in non-sludge-forming concentration, lime-containing tar derived from cracking oil in the presence of lime, the treated oil being characterized by stability against the formation of organic and inorganic sediment.

RALPH T. GOODWIN.